Dec. 18, 1928. 1,695,781
J. E. OTIS
GREASE TRAP
Filed June 28, 1927  3 Sheets-Sheet 1
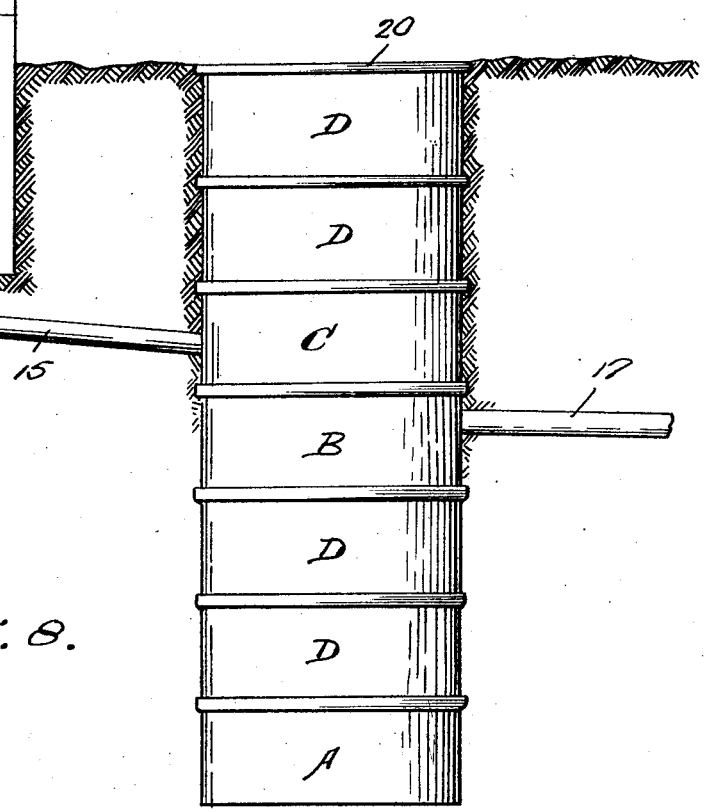
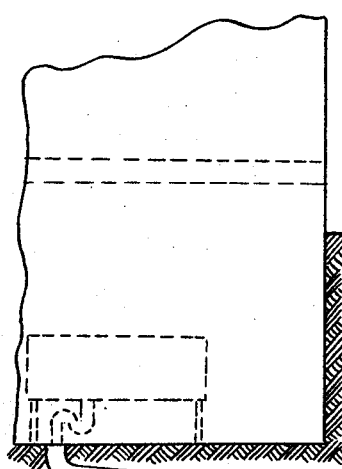
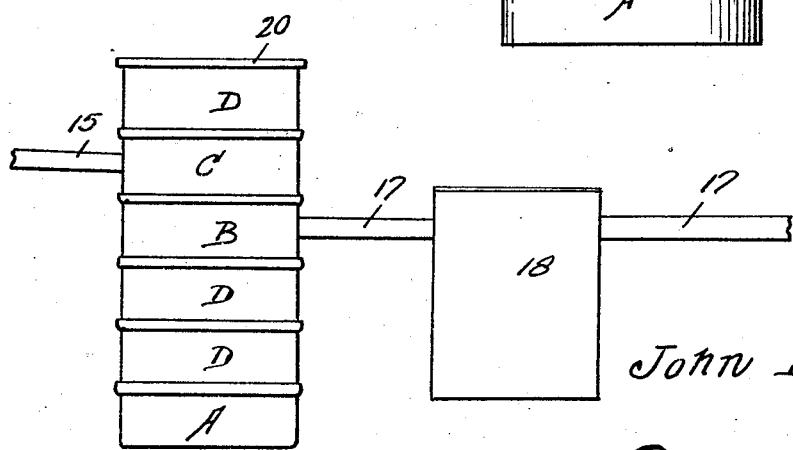
Inventor
John E. Otis,
By Clarence A. O'Brien
Attorney

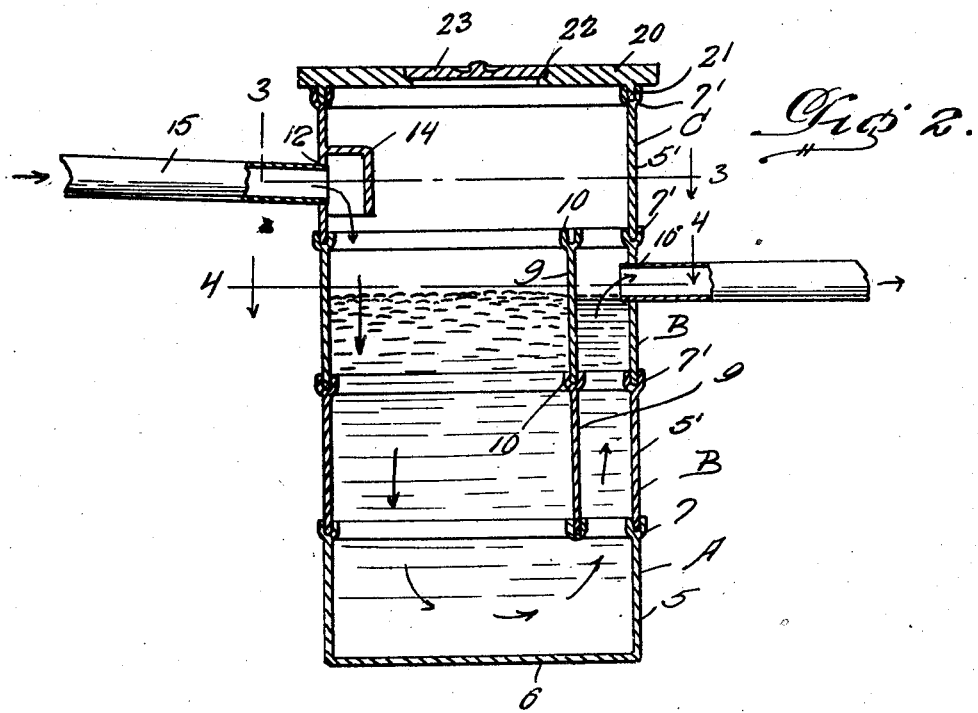

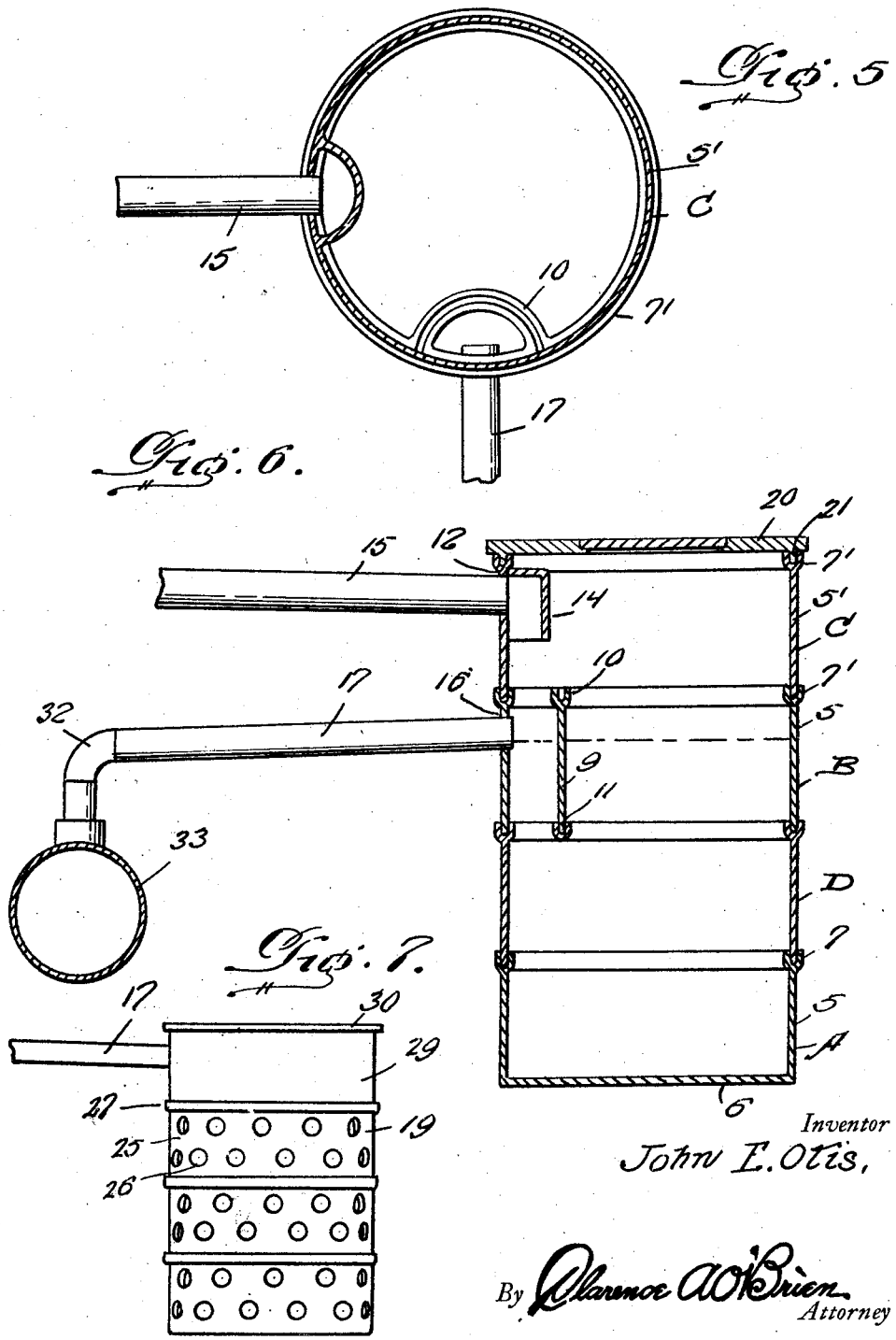

Patented Dec. 18, 1928.

1,695,781

UNITED STATES PATENT OFFICE.

JOHN EDWARD OTIS, OF WEST NEW YORK, NEW JERSEY.

GREASE TRAP.

Application filed June 28, 1927. Serial No. 202,024.

The present invention relates to the treatment of sewage from kitchens, laundries, and other places, and to the disposal of the water incident thereto.

The prime object of the invention is to provide a grease trap which is adapted to meet all circumstances with satisfaction, efficiency, and economy.

Another important object of the invention resides in the provision of a grease trap of sectional formation, easy to assemble, inexpensive to manufacture and to install, strong and durable, thoroughly reliable in use, accessible, adjustable, and otherwise well adapted to the purposes for which it is designed.

With the above and numerous other objects in view as will appear as the description proceeds the invention resides in certain novel features of construction, and in the combination and arrangement of parts as will be hereinafter more fully described and claimed.

In the drawings:

Figure 1 is an elevation of a grease trap embedded in the ground and connected with the sewerage pipe leading from a house or the like, Figure 2 is a vertical sectional view through a grease trap as in Figure 1, but showing a less number of sections, Figure 3 is a horizontal section taken on the line 3—3 of Figure 2, Figure 4 is another horizontal section taken on the line 4—4 of Figure 2, Figure 5 is a section similar to Figure 3 but taken through another embodiment of the invention, Figure 6 is a section similar to Figure 2 but taken through another embodiment of the invention, Figure 7 is an elevation of a seepage device, Figure 8 is an elevation of a grease trap connected with a septic tank.

Referring to the drawings in detail it will be seen that the trap comprises a plurality of sections. The bottom section comprises a cylindrical wall 5 and a bottom 6. The upper edge of the cylindrical wall 5 is provided with an annular channeled bead 7. All of the other sections comprise cylindrical walls 5' and annular channeled beads on the upper edge thereof denoted by numerals 7' but these other sections have no bottoms. The sections are super-imposed, one above the other, as is clearly illustrated in different figures of the drawings and the size and capacity of the trap may be regulated by the number of sections used as will be quite apparent. The sections may thus be manufactured in large quantities and sold in sets to meet the requirements of the particular purchaser. This feature will greatly decrease the cost of manufacture and enable one to economically build a grease trap of the size and dimensions required under the desired circumstances. For the purposes of convenience, the bottom section is denoted by the letter A, other sections by the letter B, other sections by the letter C and still other sections by the letter D. One or more of the sections B may be used as is illustrated to advantage in Figures 2 and 6. Each section B as heretofore indicated includes the cylindrical wall 5' and the channeled bead 7' and also is provided with a partition 9 which extends from the upper edge to the lower edge of the wall 5' and is of arcuate formation disposed eccentrically to the wall 5' and having its ends merging into said wall as an integral part thereof. The upper edge of the arcuate partition 9 is provided with a channel bead 10 to receive the lower edge of another partition 9 when two or more of the sections B are used as is illustrated to advantage in Figure 2. If one section B only is used, the section therebelow such as the bottom section A in Figure 2 or the section D in Figure 6 will have its bead formed with a notch 11 to receive the lower edge of the partition. The sections D are what as are usually termed "plain sections" consisting merely of wall 5' and the channel bead 7'. These sections D may be used either below or above the section or sections B or both. The section C comprises the cylindrical wall 5' and the channel bead 7' but has its wall 5' formed with an opening 12 and an interior shield 14 is provided extending inwardly of the wall 5' above the opening 12 and then downwardly to terminate a distance below the opening. Sewage pipe or conduit 15 extends into the opening 12 and leads from the sewage system of a house or the like as is clearly indicated in Figure 1. If one section B is used the same will be formed with an opening 16 adjacent the upper edge thereof and if two or more sections B are used the uppermost will be provided with an opening 16. A water outlet pipe 17 extends into the opening 16 and may lead to a septic tank 18 as is illustrated in Figure 8 or may lead to a seepage device 19 as shown in Figure 7.

A cover 20 is of a disc-like formation and has an annular rib 21 depending from the bottom surface thereof to fit in the uppermost bead 7'. An opening 22 is formed in the center of the cover 20 and receives a closure 23.

Attention is directed to the adjustability possessed by this grease trap whereby the partitions 9 may be located in different positions in respect to the opening 12 and shield 14. Thus the partitions 9 may be disposed diametrically opposite the openings 12 as is indicated in Figures 2 and 3 or may be disposed 90 degrees therefrom as is shown in Figure 5 or immediately thereunder as is indicated in Figure 6. Obviously, these partitions may be located in other positions than those illustrated specifically in the drawings.

An understanding of the operation of the grease trap specifically illustrated in Figure 2 will suffice for all of the other embodiments. The sewage flows by gravity through the inclined pipe 15 into the compartment formed by the shield 14 of the sections C to collect in the other sections D, B, and A until the level of the sewage rises to the opening 16 and the water will flow out through the pipe 17 either to a seepage device 19 or to a septic tank 18 and then if desired to a seepage device 19. The pipe 17 furnishes the outlet connection of the trap. Obviously, as the sewage collects in the trap the grease rises to the top thereof and therefore will not collect in the compartments formed in the sections B by the partitions 9. Thus this grease is trapped and allows the ready take-off of the water and the like as is desirable.

The septic tank 18 may be of any conventional or preferred construction. It is preferable in using a seepage device to construct the same somewhat in accordance with the structure of this trap, that is to provide a plurality of sections having cylindrical walls 25 perforated as is indicated at 26 and having their upper edges formed with channel beads 27 similar to beads 7 and 7'. The bottom section is preferably provided with a closed bottom as is the section A of the trap. The uppermost section has its cylindrical wall 29 imperforated and receives the pipe 17 from the grease trap or a similar pipe 17' from the septic tank and this upper perforated section 9 will have a closure 30 provided thereon constructed in accordance with the closure 20.

In Figure 6 I have shown the pipe 17 connected by suitable coupling 32 to a sewage pipe 33 such as is used in cities and the like.

It is thought that the construction, operation, utility, and advantages of this invention will now be quite apparent to those skilled in this art without a more detailed description thereof. The present embodiments of the invention have been disclosed in detail merely by way of examples since in actual practice they attain the features of advantage enumerated as desirable in the statement of the invention and the above description. It will be apparent that changes in the details of construction, in the sizes, and in the combination and arrangement of the parts may be resorted to without departing from the spirit or scope of the invention as hereinafter claimed or sacrificing any of its advantages.

Having thus described my invention what I claim as new is:—

1. A grease trap of the class described formed of concrete comprising a bottom section having a cylindrical wall provided with a channel bead for its upper edge and a bottom at its lower edge, intermediate portions comprising a cylindrical wall having its lower edge receivable in the channel bead of the bottom section and having a channel bead formed on its upper edge, an arcuate partition in the second section eccentrically thereof, a third section having a cylindrical wall with its lower edge received in the channel bead of the second section and formed with a channel bead at its upper edge, the wall of the third section formed with an opening, and a shield extending inwardly from the wall of the third section above the opening and then downwardly to terminate below the opening, a disc-like cover having an annular rib depending from its lower surface to be received in the channeled bead of the third section, said second section having an opening adapted to receive an outlet pipe.

2. A grease trap of the class described formed of concrete comprising a bottom section having a cylindrical wall provided with a channel bead on its upper edge and a bottom at its lower edge, intermediate portions comprising a cylindrical wall having its lower edge receivable in the channel bead of the bottom section and having a channel bead formed on its upper edge, an arcuate partition in the second section eccentrically thereof, a third section having a cylindrical wall with its lower edge received in the channel bead of the second section and formed with a channel bead at its upper edge, the wall of the third section formed with an opening, and a shield extending inwardly from the wall of the third section above the opening and then downwardly to terminate below the opening, a disc-like cover having an annular rib depending from its lower surface to be received in the channeled bead of the third section, said cover being provided with a central opening and a closure for said opening, said second section having an opening adapted to receive an outlet pipe.

3. A grease trap of the class described formed of concrete comprising a bottom section having a cylindrical wall provided with a channel bead for its upper edge and a bottom at its lower edge, an intermediate section comprising a cylindrical wall having its lower edge receivable in the channel bead of the bottom section and having a channel bead formed on its upper edge, an arcuate partition in the second section eccentrically thereof, a third section having a cylindrical wall with its lower edge received in the channel bead of the second section and formed with a channel bead at its upper edge, the wall of the third section formed with an opening, and a shield extending inwardly from the wall of the third section above the opening and then downwardly to terminate below the opening, said second section having an opening adapted to receive an outlet pipe, said opening leading into the compartment formed by said partition.

4. A grease trap of the class described formed of concrete comprising a bottom section including a bottom with a cylindrical wall rising therefrom and having its upper edge formed with a channeled bead, a second section formed with a cylindrical wall having the upper edge thereof formed with a channel bead and provided with a transverse arcuate partition eccentric to the wall and having a channel bead at the upper edge thereof, said second section having an opening adapted to receive an outlet pipe, one or more third sections each comprising a cylindrical wall having a channeled bead at the upper edge thereof, said second and third sections being located one above the other, a fourth section formed with a cylindrical wall having a channel bead at its upper edge, said wall of the fourth section being provided with an opening and a shield extending from the wall above the opening and then downwardly interiorly of the fourth section, said fourth section being located above the second and third sections.

5. A grease trap of the class described formed of concrete comprising a bottom section including a bottom with a cylindrical wall rising therefrom and having its upper edge formed with a channeled bead, a second section formed with a cylindrical wall having the upper edge thereof formed with a channel bead and provided with a transverse arcuate partition eccentric to the wall and having a channel bead at the upper edge thereof, said second section having an opening adapted to receive an outlet pipe, one or more third sections each comprising a cylindrical wall having a channeled bead at the upper edge thereof, said second and third sections being located one above the other, a fourth section formed with a cylindrical wall having a channel bead at its upper edge, said wall of the fourth section being provided with an opening and a shield extending from the wall above the opening and then downwardly interiorly of the fourth section, said fourth section being located above the second and third sections, a cover of disc-like formation formed with an annular rib depending from the lower surface thereof.

6. A grease trap of the class described formed of concrete comprising a bottom section including a bottom with a cylindrical wall rising therefrom and having its upper edge formed with a channeled bead, a second section formed with a cylindrical wall having the upper edge thereof formed with a channel bead and provided with a transverse arcuate partition eccentric to the wall and having a channel bead at the upper edge thereof, said second section having an opening adapted to receive an outlet pipe, one or more third sections each comprising a cylindrical wall having a channeled bead at the upper edge thereof, said second and third sections being located one above the other, a fourth section formed with a cylindrical wall having a channel bead at its upper edge, said wall of the fourth section being provided with an opening and a shield extending from the wall above the opening and then downwardly interiorly of the fourth section, said fourth section being located above the second and third sections, a cover of disk-like formation formed with an annular rib depending from the lower surface thereof, and provided centrally with an opening and a closure for said opening.

In testimony whereof I affix my signature.

JOHN EDWARD OTIS.